S. BECK.
Devices for Detaching Horses from Vehicles.

No. 133,822. Patented Dec. 10, 1872.

Witnesses.
C. Wahlers
Ernst Bilhuber

Inventor.
S. Beck
By Van Santvoord & Hauff
his attys

UNITED STATES PATENT OFFICE.

SIGMUND BECK, OF NEW HAVEN, CONNECTICUT.

IMPROVEMENT IN DEVICES FOR DETACHING HORSES FROM VEHICLES.

Specification forming part of Letters Patent No. 133,822, dated December 10, 1872.

*To all whom it may concern:*

Be it known that I, SIGMUND BECK, of New Haven, in the county of New Haven and State of Connecticut, have invented a new and Improved Device for Detaching Horses from Carriages; and I do hereby declare the following to be a full, clear, and exact description thereof, which will enable those skilled in the art to make and use the same, reference being had to the accompanying drawing forming part of this specification, in which drawing—

Figure 1:
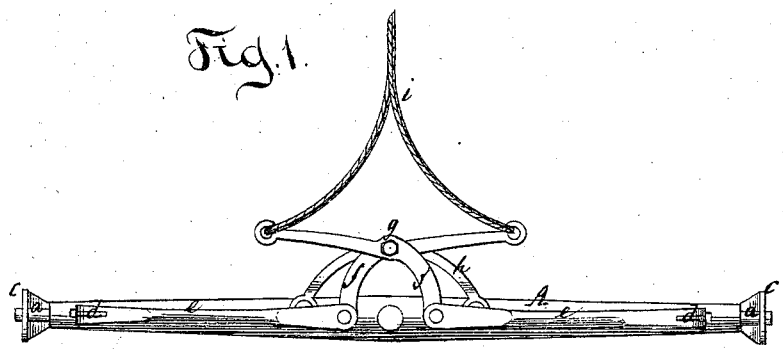
Figure 2:
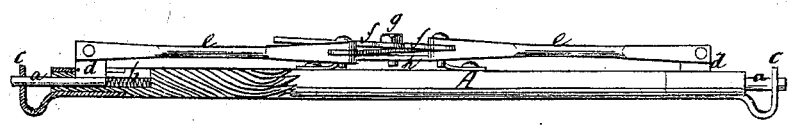
Figure 3:
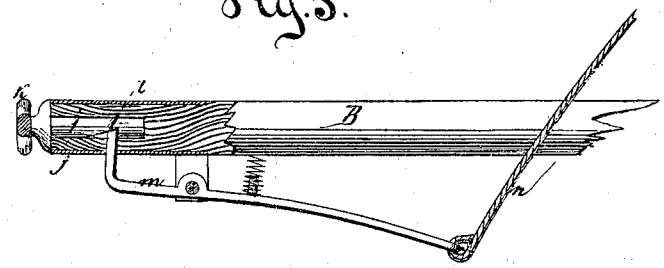

Figure 1 represents a plan or top view of a whiffletree or single-tree provided with my detaching mechanism; Fig. 2 is a sectional side view of the same; and Fig. 3 is a sectional side view of the front end of the draft-pole provided with my detaching mechanism.

Similar letters indicate corresponding parts.

This invention consists in the arrangement of spring-bolts in the ends of a whiffletree; said bolts being subjected to the action of springs which have a tendency to cause them to project through guards secured to the whiffletree for the purpose of retaining the traces, while both bolts connect with bell-crank levers, which have their fulcrums on a common pivot secured in a bracket attached to the whiffletree, and both of which are connected to the detaching-strap, which extends up to the driver's seat in such a manner that when the detaching-strap is slack both bolts are thrown in position to retain the traces, but when the detaching-rope is pulled both bolts are caused to recede and the traces are released. The pole-loops are secured to a pin which fits in a socket in the end of the pole, and which is provided with a notch to engage with a spring-catch that connects with the detaching-strap in such a manner that by pulling said strap the pole-loops are detached from the pole at the same time, when the traces are detached, and the horses are allowed to run unencumbered by any portion of the carriage.

In the drawing, the letter A designates a whiffletree which is provided in its ends with sockets to receive bolts *a a*. These bolts are subjected each to the action of a spring, *b*, (see Fig. 2,) which has a tendency to throw its bolt out and to cause the same to project through a guard, *c*, that is secured one to each end of the whiffletree. Each of the bolts *a* is provided with a lug, *d*, which projects through a slot in the whiffletree, and prevents the bolt from dropping out of its socket. Said lugs connect by rods *e e* with bell-crank levers *f f*, which turn on a pivot, *g*, secured in a bracket, *h*, which is firmly attached to the whiffletree at or near its center. The loose ends of said bell-crank levers connect with the detaching-strap *i*.

By pulling this strap the bolts *a* are thrown back, and if the traces have been retained by said bolts they (the traces) are released, and the horse is detached from the whiffletree.

In two-horse carriages each of the single-trees is provided with a detaching mechanism, as above described, and the detaching-straps extend from each whiffletree up to the driver's seat; but in two-horse carriages the horses are secured to the draft-pole by the pole chains or straps; and in order to detach the horses entirely from the carriage I have provided the draft-pole B, Fig. 3, with a socket in its outer end to receive a pin, *j*, which carries the loop *k* for the pole chains or straps. The pin *j* is provided with a notch, *l*, to engage with a spring-catch, *m*, which is secured to the draft-pole, and connects with a detaching rope or strap, *n*. By pulling this strap the spring-catch is caused to release the pin *j*, and the pole-loops are detached from the pole.

By this arrangement I am enabled to detach the horse or horses from every part of the carriage, so that the same when released are not frightened by the whiffletrees rattling behind them or coming in contact with their legs.

What I claim as new, and desire to secure by Letters Patent, is—

1. The bolts *a a* provided with guide-lugs *d d* and reacting-springs *b b*, and arranged in sockets in respect to the guards *c c*, as shown, in combination with the pivoted rods *e e* and the bell-crank levers *f f*, said levers being pivoted upon the bracket *h* and operated by connection *l*, as and for the purpose specified.

2. The lever *m* pivoted upon the pole B, and operated by a spring and a detaching-rope, $n$, in combination with the removable notched pin $j$ of the loops $k$, as and for the purpose specified.

3. The combination of a detaching mechanism on the whiffletree or single-trees of a carriage with a detaching mechanism on the draft-pole, when the parts are constructed and arranged substantially in the manner shown and described.

SIGMUND BECK.

Witnesses:
   THOS. G. SLOAN,
   SELIGMAN ZUNDER.